Sept. 20, 1932.     J. A. WALLER     1,878,077
DEVICE FOR SETTING CIRCULAR SAWS
Filed July 16, 1929
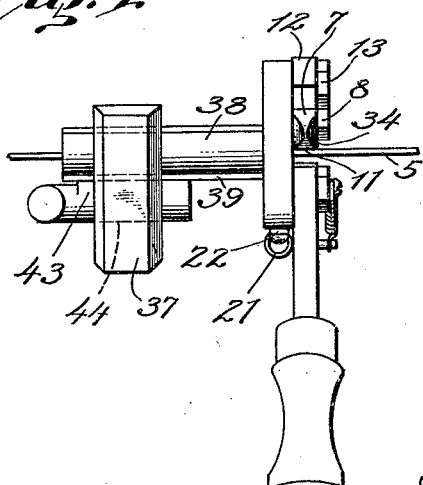
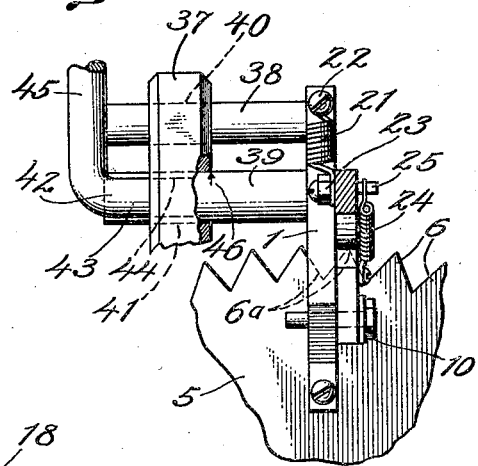
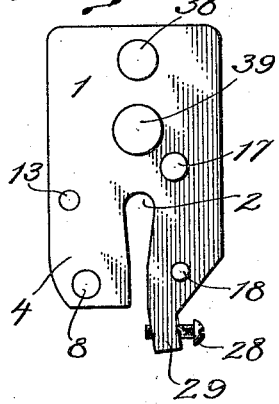
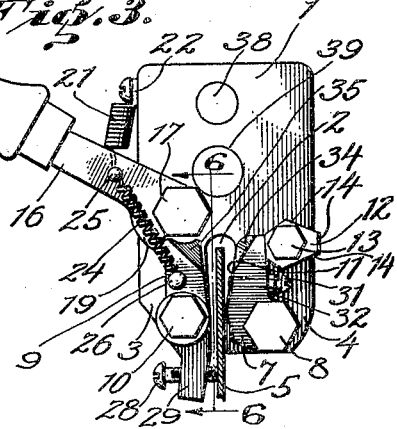
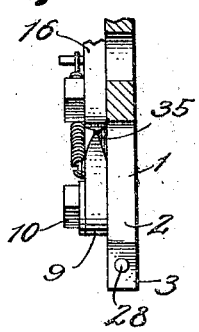
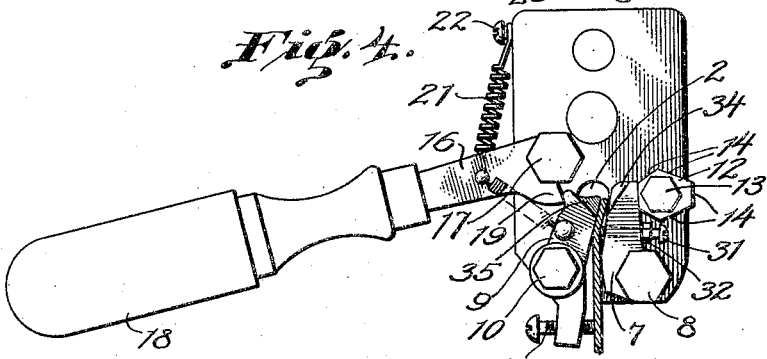
INVENTOR.
John A. Waller
BY *Arthur P. Knight*
and *Alfred W. Knight*
ATTORNEYS Patented Sept. 20, 1932

1,878,077

UNITED STATES PATENT OFFICE

JOHN A. WALLER, OF BEVERLY HILLS, CALIFORNIA, ASSIGNOR TO WALLER MANUFACTURING CORPORATION, LTD., OF LOS ANGELES, CALIFORNIA, A CORPORATION OF NEVADA

DEVICE FOR SETTING CIRCULAR SAWS

Application filed July 16, 1929. Serial No. 378,784.

This invention relates to means for setting the teeth of circular saws and the principal object thereof is to provide a novel and advantageous device for this purpose, which may be used for setting various sizes of teeth and for giving any desired degree or set of angular inclination to said teeth.

The device comprises essentially a fixed supporting member, relatively fixed and movable dogs mounted on said supporting member and adapted to be brought into position at opposite sides of the teeth to be set, the fixed dog having a bearing face disposed toward the teeth of the saw when in such position and inclined to the plane of the saw, so as to diverge outwardly therefrom, and the movable dog being adapted to move from a position free of the saw tooth to a position to engage said tooth and forcibly bend the same back against said inclined bearing face of the fixed dog, means tending to hold said movable dog in said first-named position, and manually operable means for moving said movable dog to said second named position. The device also comprises certain additional advantageous features which will be more fully pointed out hereinafter.

The accompanying drawing illustrates a setting device according to my invention and referring thereto:

Fig. 1 is a plan view of the device mounted on a relatively stationary support in proper relative position with respect to the saw.

Fig. 2 is a partly broken front elevation of the device.

Fig. 3 is a side elevation in inoperative position, taken from the right side of Fig. 2.

Fig. 4 is a similar view with the movable dog in operated position.

Fig. 5 is an elevation of the opposite side of the device.

Fig. 6 is a partial section on line 6—6 in Fig. 3.

The device comprises a supporting member or plate 1 having a notch or recess 2 extending upwardly from the lower edge thereof so that the two side portions 3 and 4 at the opposite sides of said notch are adapted to extend down over the sides of a circular saw indicated at 5 and to embrace the teeth 6 of said saw therebetween. For setting the teeth of the saw, a relatively fixed dog 7 is mounted on side portion 4 as by means of screw 8, and a relatively movable dog 9 is pivotally mounted on said portion 3 by means of screw 10.

The forward face 11 of dog 7, that is, the face disposed toward the saw, is inclined away from the plane of the saw in a direction toward the outer edge of the teeth, and means are preferably provided for varying or adjusting the amount of such inclination and for adjusting the upper end of said dog inwardly and outwardly with respect to the saw. For this purpose, the dog 7 may be moved about screw 8 as a pivot, the axis of said pivot extending substantially parallel to the pivotal axis of the movable dog 9, substantially perpendicular to the plane of operation of said dogs, and a stop member 12 is mounted on supporting member 1 in position to engage against the rear face of the upper portion of said dog, said stop member being pivotally mounted upon screw 13 and having a plurality of faces 14 lying at different distances outwardly from the center of said screw. For adjusting the position of dog 7, the screws 8 and 13 may both be loosened, and stop member 12 turned to position with any desired one of the faces 14 disposed toward said dog, and said dog may then be brought into tight engagement against said face and screws 8 and 13 may both be tightened.

For operating the movable dog 9, there is provided a lever 16, pivotally mounted on supporting member 1 as by means of screw or pin 17, and having handle means 18, said lever being also provided with a shoulder or projection 19 engaging a suitably shaped shoulder portion 20 on said movable dog, so that depression of said lever by means of handle 18 forces said dog to move in a clockwise direction about its pivot (Figs. 3 and 4) and toward the relatively fixed dog. Lever 16 is biased toward raised or inoperative position by means of spring 21 secured at 22 to supporting member 1 and at 23 to said lever, while a second spring 24 having one end connected at 25 to said lever and the other end connected at 26 to movable dog 9, tends to hold said dog forwardly in position free from engagement with the saw when said lever is in such raised or inoperative position, as shown in Fig. 3.

The device is also provided with a holding member, such as screw 28, mounted on an arm 29 projecting downwardly from side portion 3 in front of the position of the saw, so as to engage the front face of the saw and prevent bending of the main portion of the saw blade, thus confining the bending substantially wholly to the teeth. Said holding screw 28 may be adjusted forwardly or rearwardly, so as to accommodate saws of different thicknesses between the inner end of said holding screw and the rear face of notch 2.

In order to cause the teeth to be bent more sharply at the outer end portions thereof, or for operating on teeth of slight depth, the relatively fixed dog 7 may also be provided with an adjustable tooth engaging member, such as screw 31 extending from rear to front through said dog somewhat above the lower edge of the inclined forward face 11 thereof. Said screw may be retracted within said dog, so as to be ineffective, in which case the direction to which the teeth are bent is determined by the inclination of face 11, or may be adjusted, so that its forward end projects somewhat, as shown in Figs. 3 and 4, so that the bending of the tooth is caused to take place either wholly or to a greater extent above said screw, as is illustrated in Fig. 4. Said screw may also be provided with a lock nut 32 for holding the same securely in adjusted position. When said screw 31 is used, the inclination to which the teeth will be bent or set is determined by the relative position of the upper end of the relatively fixed dog 7 with respect to the inner end of said screw, and such inclination may therefore be adjusted, as before, by angular adjustment of said relatively fixed dog about its pivot 8.

The dogs 7 and 9 should be of sufficient width and thickness to provide the necessary strength for bending the teeth of the saw, but the width thereof in a direction parallel to the pivotal axis of the movable dog should, as shown, not materially exceed the width of a tooth of the saw, so that during the setting of any one tooth said dogs will not engage or strike adjacent teeth. Furthermore, in order to permit the same to operate on teeth which are of small size and therefore disposed close together, the upper end of relatively fixed dog is beveled or tapered forwardly and inwardly toward the vertical median plane of the inner face as shown at 34, while the upper portion of relatively movable dog 9 is beveled or tapered rearwardly and inwardly toward the vertical median plane of its rear face, as shown at 35.

The above described setting device may be mounted on any suitable support for holding the same in proper relative position with respect to the teeth of the saw. A portion of such a fixed support is indicated at 37 in Figs. 1 and 2, and said device is shown as mounted thereon by means of rods or arms 38 and 39 extending laterally from plate 1 through openings 40 and 41 in said support, and may be secured in position thereon by means of a clamping lever 42 having an eccentric portion 43 extending in an opening 44 in support 37 which lies alongside and communicates with the opening 41, and a handle portion 45 whereby said eccentric portion may be rotated to bring the same into or out of clamping engagement with arm 39. In order to designate the proper lateral position of the setting device with respect to support 37, arm 39 may be provided with a mark 46 and the setting device may be mounted with said mark in alignment with the near face of support 37. The support 37 may, for example, be part of a supporting device such as shown in my pending application for apparatus for dressing circular saws, Serial No. 378,783, filed July 16, 1929 although the setting device covered in this application is not limited to use with this particular type of supporting means.

In operating the setting device, the same is mounted in the position shown in the drawing and one of the teeth of the saw, such as tooth 6a in Fig. 2, is brought into position between the dogs 7 and 9. Lever 16 is then depressed by means of handle 18, forcing the dog 9 inwardly, so as to bend this tooth or the upper portion thereof rearwardly from the plane of the saw and set the same as shown in Fig. 4. When the downward pressure on handle 18 is removed, springs 21 and 24 will act to return lever 16 and dog 9 to inoperative positions as shown in Fig. 3. It is evident that relatively fixed dog 7, holding screw 28 and tooth engaging member 31 may be adjusted to any desired positions, so as to accommodate saws of different thicknesses and having teeth of different sizes, and to give any desired degree of inclination to such teeth.

When this first tooth has been sufficiently set, the next similarly disposed tooth may be brought into the position of the tooth 6a and the operation repeated, and this procedure is continued until all of the similarly disposed teeth have been properly set. The position of the saw may then be reversed and the operation repeated on the oppositely disposed teeth, so as to set these latter teeth in an opposite direction from the plane of the saw.

I claim:

A device for setting circular saws comprising a supporting member, relatively fixed and movable dogs mounted on said supporting member and having opposing faces adapted to be brought into position at opposite sides of a tooth of a circular saw, said relatively fixed dog being rotatably adjustable about an axis substantially perpendicular to the plane of operation of said dogs and said relatively fixed dog extending upwardly from said axis, a tooth engaging member mounted on said relatively fixed dog intermediate the height thereof and adjustable forwardly and rearwardly with respect to said face thereof, said tooth engaging member being movable to positions projecting beyond said face of said relatively fixed dog and to positions retracted within said dog, said movable dog being adapted to move from a position free from engagement with the saw to a position to engage a tooth placed between said dogs and forcibly bend the same back against said tooth engaging member and the upper portion of said relatively fixed dog, means tending to hold said movable dog in said first named position, and manually operable means for moving said movable dog to said second named position.

In testimony whereof I have hereunto subscribed my name this 10th day of July, 1929.

JOHN A. WALLER.